W. GRANBERG.
GUARD FOR SAWING MACHINES.
APPLICATION FILED OCT. 5, 1921.
1,430,983.
Patented Oct. 3, 1922.
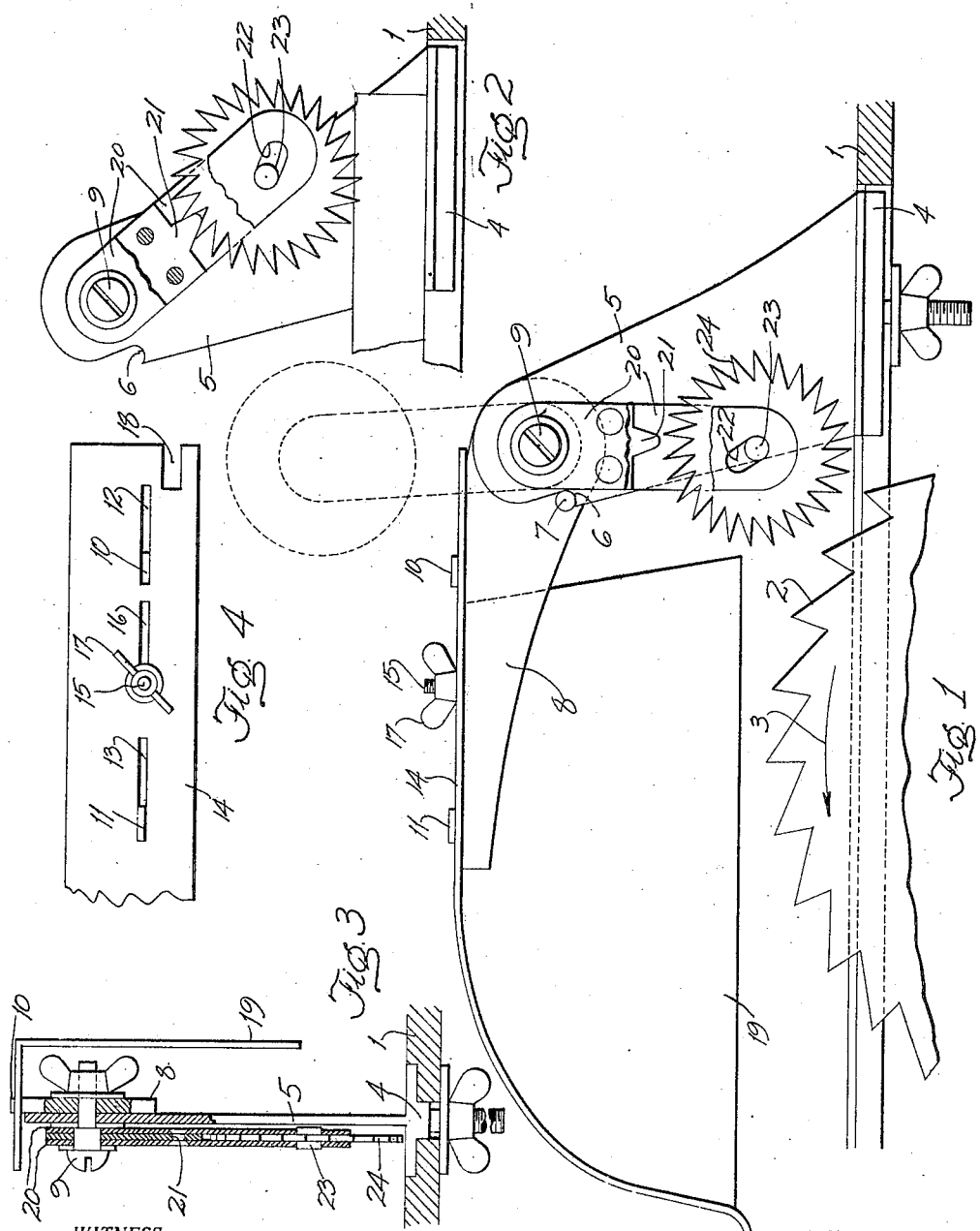

Patented Oct. 3, 1922.

1,430,983

UNITED STATES PATENT OFFICE.

WILHELM GRANBERG, OF CHICAGO, ILLINOIS.

GUARD FOR SAWING MACHINES.

Application filed October 5, 1921. Serial No. 505,473.

*To all whom it may concern:*

Be it known that I, WILHELM GRANBERG, a citizen of the United States, residing at Chicago, in the county of Cook and State of Illinois, have invented certain new and useful Improvements in Guards for Sawing Machines, of which the following is a specification.

This invention relates to improvements in guards for sawing machines and it contemplates the provision of automatic means arranged preferably beside the saw blade to prevent the board that is split in passing through the machine from being thrown upward or back toward the operator by the saw. A further object is to provide a device of this type that is simple in construction and cheap to manufacture.

With the foregoing and other objects in view the invention consists in the combination and arrangement of parts to be hereinafter fully described, pointed out in the appointed claims and illustrated in the accompanying drawing which forms a part of this application and in which—

Fig. 1 is a view in side elevation of a saw guard embodying my present invention and illustrating its application.

Fig. 2 is a fragmentary view of Fig. 1 with the movable parts in an altered position.

Fig. 3 is a sectional end view through Fig. 1.

Fig. 4 is a fragmentary plan view of the hood.

Like reference characters denote corresponding parts throughout the several views.

The reference numeral 1 denotes the saw table provided with the rotary saw 2 which rotates in the direction denoted by the arrow 3. A base plate 4 imbedded in a perforated portion of the saw table supports a standard 5 formed upon one edge with the rounded shoulder 6 adapted to receive the stop lug 7 carried by the bridge bar 8 which bar is secured by the set screw 9 to the standard 5, said bridge bar being formed along its upper edge with the lugs 10, 11 adapted for disposal in the elongated slots 12, 13 of the shield 14, said bridge bar being provided also with a threaded stem 15 adapted for disposal in the elongated slot 16 of the shield to receive the wing nut 17. The shield 14 is formed with the notch 18 in one end and with the side shield 19.

Pivotally supported upon the set screw 9, aforesaid, is the pendant formed of the side bars 20 separated by the spacer plate 21, said pendant being formed with the slot 22 disposed at an angle to the pendant and receiving the axis 23 of the ratchet 24 which is so suspended, normally, that it is disposed immediately above the saw table, the teeth of said ratchet being so disposed that the board being split will, when it contacts with the ratchet, raise and pass beneath the same but will be prevented, by the ratchet, from movement in a reverse direction or in an upward direction. In Fig. 2 the split board has just encountered the ratchet after having left the saw and has raised the axis 23 in the slot 22 and moved the pendant in the direction of movement of the split board which is away from the saw. When the board first encountered the ratchet the pendant was in the position shown, full lines, in Fig. 1, substantially vertical or at right angles to the upper surface of the table 1. As the board advanced it moved the ratchet, with the pivotally mounted pendant, into the position shown in Fig. 2. Substantially this position must be maintained by the pendant as long as the board continues to move in the same direction, the ratchet merely being rotated by the movement of the board and supported thereupon. Should movement of the board in the reverse direction be started the ratchet will cease to rotate and its teeth will bite into the board and instantly arrest such movement. The pendant is so hung that it will gravitate against the stop lug 7 when not in use and there remain in position for contact by the board under operation. Should it not be desired, for any reason, to use the pendant it may be raised into the position shown dotted in Fig. 1 and disposed in the notch 18 of the shield. The shield and bridge bar are adjustable vertically through the medium of the set screw 9.

What is claimed is:—

1. In a guard for sawing machines, a pendant arranged above the saw table adjacent the saw blade, a ratchet carried by said pendant, and a shield arranged above the saw blade and in spaced relation to said pendant and notched terminally to receive and retain said pendant in one position of the same.

2. In a guard for sawing machines, a standard arranged upon the sawing machine table, a stop lug associated with said standard, a pendant so pivoted to said standard as to normally gravitate into contact with said stop lug, a ratchet carried by said pendant and normally disposed immediately above the saw table adjacent the saw blade, and a shield arranged above the saw blade and in spaced relation to said pendant and notched terminally to receive said pendant in one position of the same.

3. In a guard for sawing machines, a standard arranged upon the sawing machine table, a bridge bar carried by said standard, a stop lug carried by said bridge bar for engagement with said standard, a pendant pivotally carried by said standard normally in contact with said stop lug, a ratchet carried by said pendant normally adjacent the saw blade, and a shield adjustably carried by said bridge bar and notched terminally to receive said pendent in one position of the same.

In testimony that I claim the foregoing as my own I have hereto affixed my signature in the presence of two subscribing witnesses.

WILHELM GRANBERG.

Witnesses:
   Joz E. Durtner,
   Carl L. Osgood.